Nov. 11, 1941.  E. H. ALLEN  2,262,085
EQUIPMENT FOR TRANSPORTING TYPEWRITERS AND THE LIKE
Filed Oct. 9, 1939  2 Sheets-Sheet 1
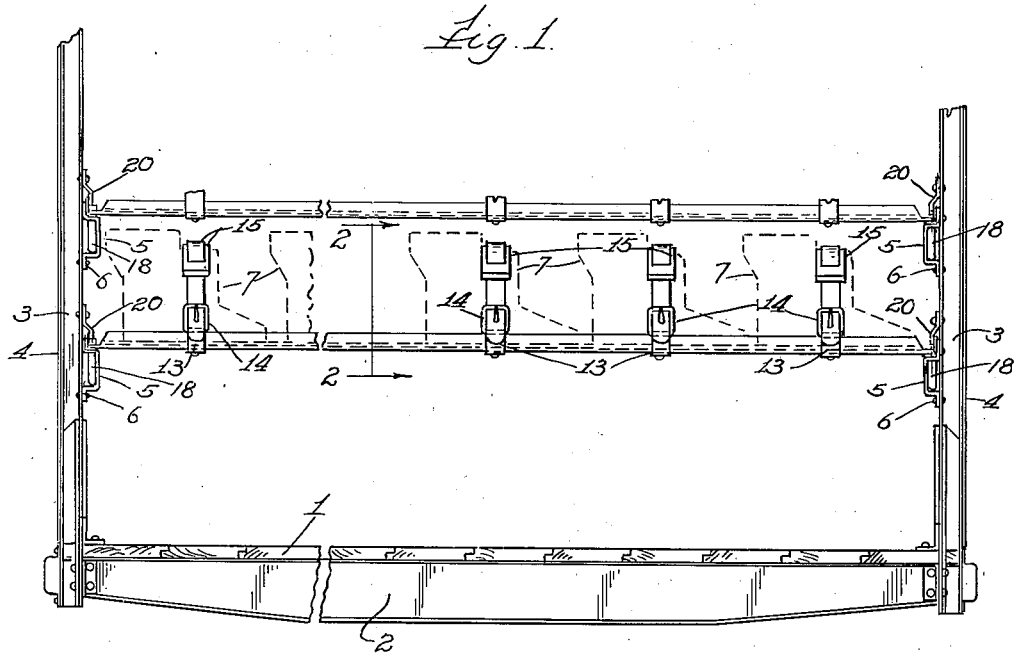
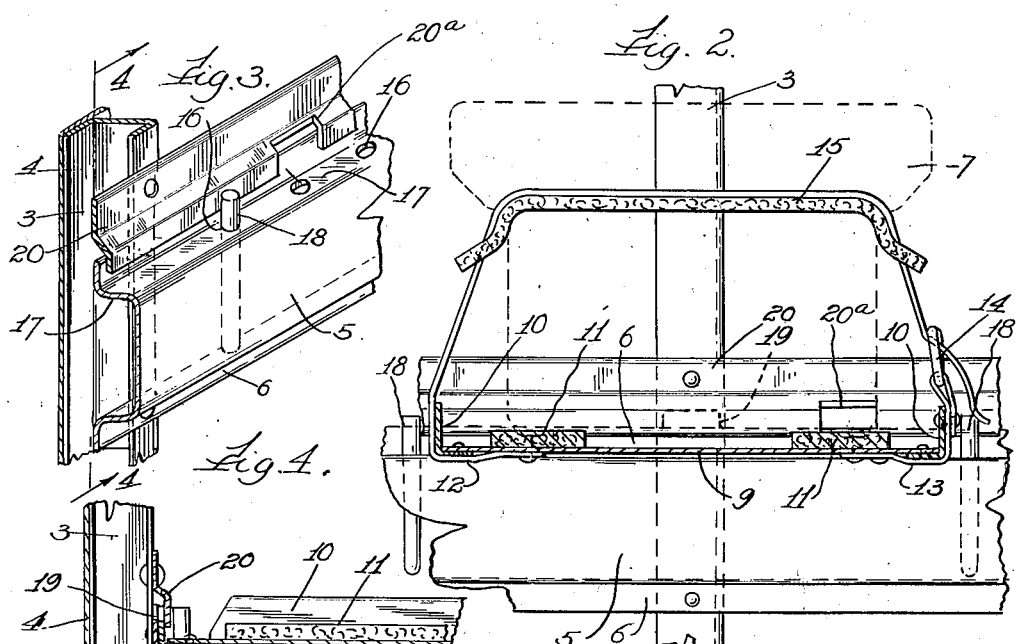
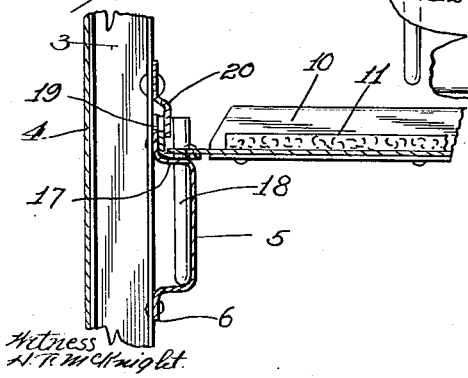
Inventor
Edwin H. Allen
by his Attys.

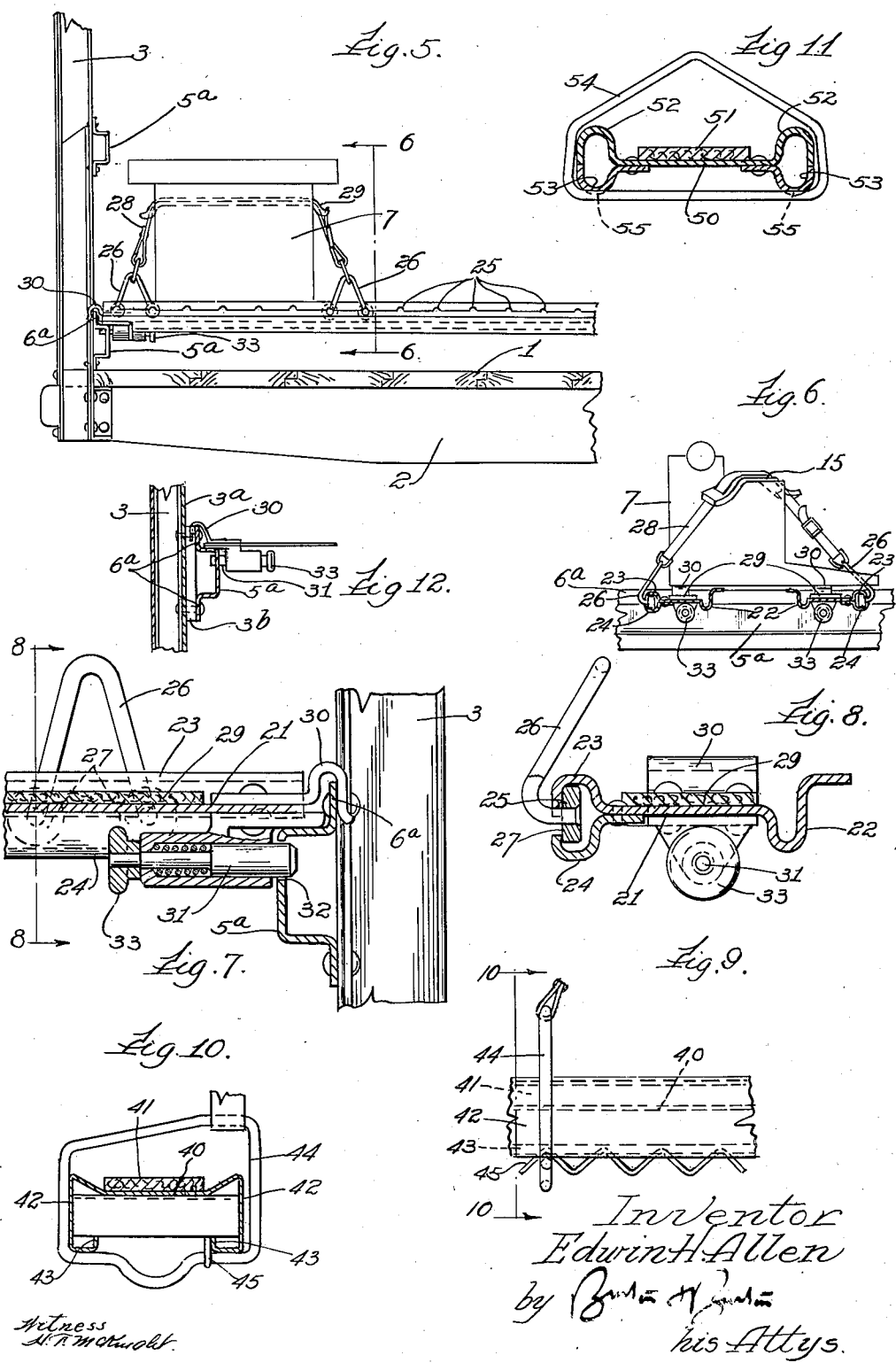

Patented Nov. 11, 1941

2,262,085

UNITED STATES PATENT OFFICE 2,262,085

EQUIPMENT FOR TRANSPORTING TYPE-
WRITERS AND THE LIKE

Edwin H. Allen, Janesville, Wis., assignor to Highway Trailer Company, Edgerton, Wis., a corporation of Wisconsin Application October 9, 1939, Serial No. 298,603

3 Claims. (Cl. 296—24)

This invention relates to the transportation of relatively delicate mechanisms or devices in road vehicles, such as motor trucks and trailers. One example of such a machine or device is the typewriter, and in the drawings and description herewith the invention is treated as applied to the transportation of typewriters to and from factories or sales agencies. In this particular field it is almost universal practice to accept an old machine in trade whenever a new machine is sold, so that transportation must be provided both to and from each customer, and the traded-in machines must often be assembled in quantities and shipped over considerable distances for reconditioning or disposal. It is general practice to box all such machines for shipment in order to protect their comparatively delicate mechanism.

One object of this invention is to provide means for safely transporting typewriters and similar devices without boxing them so as to reduce the cost of shipment. Another object is to provide such means adapted for application to various types of vehicle bodies which may not have been initially designed for such use. A further object is to provide special supporting means for the typewriters which shall be readily detachable from the vehicle body to adapt the latter for use with other types of freight, or to leave a portion of the space in the vehicle available for such other uses. It is also an object of the invention to provide simple securing means capable of holding machines in position without injuring them and so that they shall not injure each other by shifting about in the vehicle body during travel; and the invention is designed to render the supporting and securing means for the machines adjustable to various makes and sizes. The invention thus consists in certain features and elements of construction in combination, as herein shown and described and as indicated by the claims.

In the drawings:

Fig. 1 is a partial rear elevation of a vehicle body equipped with load-carrying shelves in accordance with this invention.

Fig. 2 is a transverse section on a larger scale taken as indicated at line 2—2 on Fig. 1.

Fig. 3 is a detail perspective view showing one of the shelf-supporting rails.

Fig. 4 is a detail section taken substantially as indicated at line 4—4 on Fig. 3.

Fig. 5 is a partial rear elevation similar to Fig. 1, showing a modified construction.

Fig. 6 is a section taken substantially as indicated at line 6—6 on Fig. 5.

Fig. 7 is a detail section on an enlarged scale showing the shelf-supporting rail and means by which the shelf is secured thereon.

Fig. 8 is a detail section taken as indicated at line 8—8 on Fig. 7.

Fig. 9 is a partial side elevation of a shelf embodying a further modification.

Fig. 10 is a transverse section taken as indicated at line 10—10 on Fig. 9.

Fig. 11 is a transverse section similar to Fig. 10 showing a modified form of shelf and loop engaged therewith.

Fig. 12 is a fragmentary view corresponding to Fig. 5 but showing a modified construction.

In Fig. 1, which may be considered as a somewhat diagrammatic and fragmentary rear elevation of a truck or trailer body, the floor, 1, is shown resting on a cross beam, 2, with posts or uprights, 3, at both sides. It may be understood that suitable side panels, 4, are carried on the outer faces of the posts, 3, 3. The inner faces are equipped with longitudinally extending, substantially horizontal rails, 5, which are shown as of channel form, with outwardly disposed foot flanges, 6, secured flatly against the inner surfaces of the posts, 3. The typewriters indicated in dotted outline at 7 are supported on shelves carried by the rails, 5. One form of shelf is shown in cross-section in Fig. 2 as comprising a panel, 9, preferably of sheet metal, with reinforcing angle members, 10, secured to its margins, and with strips of resilient material, such as rubber or heavy felt, extending lengthwise of the shelf at 11, in position to support the feet of the typewriters and thus protect the machines from excessive vibration or jar.

Each machine is secured in position by means of a strap consisting of two sections, 12 and 13, each having one end secured to the under side of the shelf panel, 9. The part, 13, is shown equipped with a buckle, 14, and the part, 12, is provided with a pad, 15, of felt or similar resilient and non-abrasive material, of sufficient length to fit over the upper surface of the typewriter so as to avoid rubbing or marring of the finish by the strap, 12. As a simple method of retaining the pad, 15, on the strap the pad may be provided with slots near its ends through which the strap is threaded, as indicated in Fig. 2; then, with the machine, 7, in position on the shelf, the end of the strap is passed through the buckle and secured thereby under sufficient tension to hold the machine at a definite position on the shelf.

The extreme ends of the shelves rest upon opposite, horizontally aligned pairs of the rails, 5, and to check them against sliding longitudinally along the rails each rail is formed with holes, 16, at intervals in the shelf-supporting portion, 17, of the rail so that removable pins, 18, may be set in these holes to act as stops for the edges of the shelves, or the pins may also engage holes in the shelves, if desired. The ends of each shelf may be bent up, or, as shown in Fig. 3, may have sections of angle rail attached to them to form vertical flanges, 19, so that clips, 20, secured to and offset from the inner faces of the posts, 3, will engage over these upstanding flanges, 19. This positions the shelves endwise and makes them serve as ties between the two sides of the vehicle body to resist bending of the posts and to stiffen the body generally against the centrifugal or other laterally acting forces due to the loads on the shelves during travel of the vehicle, particularly in rounding curves or traversing steeply crowned portions of the road. As indicated in Fig. 2, these clips, 20, may be continuous strips with notches, 20ª, at intervals to permit disengaging the shelves without sliding them to the extreme ends of the rails. The clips, 20, also act as hold-down devices to prevent the shelves from jumping off the rails, 5, in the event of violent vibration of the vehicle when traveling over rough roads.

Fig. 5 shows a slightly different arrangement, both in the detail structure of the supporting shelf members and in the positioning of the typewriter upon them. The upright posts, 3, of the body are equipped with channel-shaped rails, 5ª, which are quite similar to those of Figs. 1 to 4. But instead of a unitary shelf this arrangement, as shown in Fig. 6, provides a pair of relatively narrow shelves which may be spaced apart along the rails, 5ª, to adapt them to machines of different dimensions. These separate narrow shelves might be equipped with straps similar to that shown in Fig. 2, but, as a variation of this arrangement, and to provide a wider range of adjustability, Figs. 6 and 8 show each of the two shelves, 21, formed with a stiffening channel, 22, at one edge, and with a channel, 23, at the opposite edge which cooperates with an applied member, 24, to form a slotted tube. The downwardly trending edge portion of the channel, 23, is provided with notches, 25, at regular intervals, and these notches engage the bent ends of metallic loops, 26, having terminal buttons, 27, which are captive within the tubular formation, 23, 24. As seen in Fig. 6, both of the shelves, 21, which support a typewriter, 1, are equipped with loops, 26, and a securing strap, 28, is arranged to connect a loop, 26, on one of the shelves with a loop, 26, on the other shelf, and to pass over the typewriter, 1, for holding it firmly in position. As shown, the strap, 28, is passed diagonally over the typewriter frame so that in view of the locking engagement of the loops, 26, with the notches, 25, this arrangement tends to definitely position the typewriter longitudinally of the shelves. Each shelf is equipped with a strip of resilient padding, 29, on which the feet of the typewriter are adapted to rest.

As a variation of the shelf-positioning means, Fig. 7 shows the end portion of one of the shelves, 21, provided with a downwardly open hook, 30, which overhangs the upper foot flange, 6ª, of the channel, 5ª, so that with hooks, 30, at both ends of the shelf the latter serves to tie together the two side walls of the body with the same effect as the upturned flanges, 19, which engage the clips, 20, of Fig. 1. Each end of each shelf is also equipped with a spring-pressed plunger, 31, engageable in any one of a series of holes, 32, in the web of the channel rail, 5ª, for checking the shelf against movement along the rail, 5ª, and also locking it in position against vertical dislodgement. A head, 33, serves for withdrawing the plunger, 31, whenever it is desired to shift or remove the shelf from its locked position on the rail, 5ª.

Figs. 9 and 10 show a slightly different form of narrow shelf in which the metallic portion is shaped as a downwardly open channel having a middle area, 40, which supports the resilient pad, 41, and from which the material slopes upwardly to meet the vertical flanges, 42, of the channel form. The lower ends of the flanges are bent inwardly and upwardly, as seen at 43. The metallic loops for the securing straps, instead of fitting into a tubular channel, as in Fig. 8, are formed to encircle the shelf member, as seen at 44, and to provide stop shoulders at intervals in the length of the shelf for positioning these loops a serpentine wire, 45, is welded to the inner marginal portion, 43, of one of the flanges. Shelves of this type may be equipped with terminal structure similar to that shown in Fig. 7, and will be employed in pairs with suitable straps similar to that shown at 28 in Fig. 6 for holding the typewriter or other machine in place on the shelves.

Fig. 11 illustrates a further modification in the form of the shelf, particularly the narrow type in which the web portion, 50, is formed with upwardly and downwardly bent marginal portions, 52, cooperating with applied marginal channels, 53, to form tubular reinforcements at both edges of the shelf. A resilient pad, 51, is mounted on the web for engaging the feet of the typewriter or other machine carried thereby. For connection with the binding strap a closed loop, 54, of heavy wire completely encompasses the shelf, and for positioning the loop the lower bent edges of the channels, 55, may be notched, as indicated, to engage the lower side of the loop.

In all the forms of shelves herein shown it may be noted that the lower supporting web is depressed below the marginal portions of the shelf, forming a channel which will tend to prevent the loads from slipping off the edge of the shelf in either direction, even if the frictional hold of the resilient padding should prove insufficient for this purpose. With any of the structures herein shown and described it will be seen that the truck or trailer body, being equipped with side rails spaced vertically at intervals, as shown at 5 or 5ª in the drawings, may be employed for any other purpose for which it is suitable, by merely removing the shelves, leaving the space within the body clear and unobstructed. Or, if the space is not to be fully occupied by typewriters or other machines carried on the shelves, a portion of the space may be left clear for such other freight. If desired, a full set of shelves may be stacked in compact formation within the truck body for use as required, or the shelves may be left at the warehouse or factory to be installed in the trucks or trailers only when needed. It may be understood that the rails, 5 or 5ª, do not represent an expensive addition to the body structure, since, in most cases, horizontal slats are provided as a portion of the interior structure, and the special rails of this invention will serve the same purpose when handling ordinary freight with the shelves omitted.

If the body of the vehicle includes an inner lining wall such as that indicated at 3ª in Fig. 12, the rails, 5ª, may be spaced away from the wall slightly by the use of blocks, 3ᵇ, so as to allow the hooks, 30, to engage over the upper edges or flanges, 6ª, in the same manner as in the structure of Fig. 5.

While there is shown and described herein certain specific structure embodying the invention, it will be manifest to those skilled in the art that various modifications and re-arrangements of the parts may be made without departing from the spirit and scope of the invention, and that the same is not limited to the particular forms herein shown and described, except in so far as indicated by the appended claims.

I claim:

1. In a vehicle body, horizontal rails secured to the inner faces of the side walls, a shelf member extending from a rail on one side wall to a rail on the opposite wall and resting upon said rails, said shelf having upturned end portions and clips secured to the side walls and overlapping said upturned portions of the shelf for interconnecting said shelf and the side walls to cause the shelf to act as a tie between said walls, and stop means interengaging the shelf and the rails to check sliding movement of the shelf along said rails for maintaining the overlapping engagement of the clips with the shelf.

2. In a vehicle body, horizontal rails secured to the inner faces of the side walls, a shelf member extending from a rail on one side wall to a rail on the opposite side wall and resting upon said rails, said shelf having upstanding lugs at its ends and continuous strips secured to the side walls in parallel relation to the rails and overlapping said lugs of the shelf for interconnecting the shelf and the side walls, causing the shelf to act as a tie between said walls, the shelf being slidably adjustable along the rails with its lugs engaged by said strips, and said strips having notches at intervals through which the lugs may be passed by lifting the shelf off the rails to remove it.

3. In a vehicle body, a plurality of horizontal rails secured to the inner faces of both side walls and spaced apart vertically thereon, shelf members each extending from a rail on one side wall to a rail on the oppostie wall, resting upon said rails and interengaged with both rails to act as a tie between the side walls, stop means interengaging each shelf with the rails on which it rests to check sliding movement of the shelf along the rails, and additional stop means engaging the shelf to prevent its upward movement away from the rails.

EDWIN H. ALLEN.